(12) United States Patent
Ménard

(10) Patent No.: US 8,390,739 B2
(45) Date of Patent: Mar. 5, 2013

(54) CPU PLATFORM INTERFACE METHOD AND DEVICE FOR SYNCHRONIZING A STREAM OF MOTION CODES WITH A VIDEO STREAM

(75) Inventor: Jean-François Ménard, Boucherville (CA)

(73) Assignee: D-Box Technologies Inc., Longueuil QC (CA)

( * ) Notice: Subject to any disclaimer, the term of this patent is extended or adjusted under 35 U.S.C. 154(b) by 47 days.

(21) Appl. No.: 13/143,823

(22) PCT Filed: Jan. 8, 2010

(86) PCT No.: PCT/CA2010/000023
§ 371 (c)(1),
(2), (4) Date: Jul. 8, 2011

(87) PCT Pub. No.: WO2010/078657
PCT Pub. Date: Jul. 15, 2010

(65) Prior Publication Data
US 2011/0273614 A1     Nov. 10, 2011

Related U.S. Application Data

(60) Provisional application No. 61/143,264, filed on Jan. 8, 2009.

(51) Int. Cl.
*H04N 9/475* (2006.01)
(52) U.S. Cl. ...................................................... 348/510
(58) Field of Classification Search .................. 348/510, 348/500, 512, 513, 514, 515–517; 386/239, 386/248
See application file for complete search history.

(56) References Cited

FOREIGN PATENT DOCUMENTS
WO   WO 2007-143849   12/2007
WO   WO 2008-153787   12/2008

OTHER PUBLICATIONS

PCT—International Search Report (ISR)—PCT/CA2010/000023 (Form PCT/ISA/210)—Apr. 23, 2010—3 pages.

*Primary Examiner* — Paulos M Natnael
(74) *Attorney, Agent, or Firm* — Benoît & Côté

(57) ABSTRACT

The present document describes a CPU platform interface method and device for synchronizing a stream of motion codes with a video stream. The method and device use the video stream time stamps and movie identity information from the software movie player along with the CPU time clock to fill a queue of motion code frames and determine when the frames will be sent as a motion stream to one or more actuators of a motion platform.

3 Claims, 12 Drawing Sheets dboxCineMotionTypes.h :

```
#pragma once
#ifndef _DBOX_CINEMOTIONTYPES_H_INCLUDED_
#define _DBOX_CINEMOTIONTYPES_H_INCLUDED_
//----------------------------------------------------------------
// D-BOX CINE MOTION API
// Copyright (C) 2008, D-BOX Technologies Inc.
// All rights reserved.
//----------------------------------------------------------------
#include "dboxPlatformTypes.h"
include <cstdlib> pragma pack(push, 8) // Guarantees proper alignment of structures for native types members up to 8 bytes.

namespace dbox {

//----------------------------------------------------------------
    /// Cine Motion API return values.
    //----------------------------------------------------------------
    enum ECineMotionResult {
        CMR_SUCCESS = 0,                          //< Operation successful.
        CMR_ERROR = -1,                           //< Unknown error.
        CMR_ERROR_NOT_INITIALIZED = -2,           //< Error when calling a method that requires Initialize.
        CMR_ERROR_NO_STREAM_OPENED = -3,          //< Error when calling a method that requires OnStreamOpen.
        CMR_ERROR_NO_CINE_HANDLER = -4,           //< Initialize did not find an appropriate ICineHandler.
        CMR_ERROR_DLL_NOT_FOUND = -5,             //< LoadLibrary failed.
        CMR_ERROR_DLL_ENTRY_NOT_FOUND = -6,       //< GetProcAddress failed.
        CMR_ERROR_DLL_DISPOSE = -7,               //< FreeLibrary failed.
        CMR_ERROR_DLL_UNSUPPORTED_VERSION = -8    //< Unsupported version.
    };
```

Fig. 4 (1 of 5)

```
//--------------------------------------------------------------
/// Enum containing the supported StreamInfo types
//--------------------------------------------------------------
enum EStreamSourceType {
        SST_UNKNOWN          = 0,    //< Invalid StreamInfo Type
        SST_FILE             = 1,    //< Stand-alone file
        SST_DVD              = 2,    //< DVD Video
        SST_BLURAY           = 3     //< Blu-ray Disc
};

//--------------------------------------------------------------
/// D-BOX SYNC INFO
//--------------------------------------------------------------
struct SyncInfo {
        SyncInfo(F64 dPlaybackTimeS = 0, F64 dCpuTimeS = 0, F32 dAccuracyS = 0, F32 dPlaybackSpeed = 0);

F64 PlaybackTimeS;    //< Playback position in seconds
        F64 CpuTimeS;         //< CPU time related to playback time (QueryPerformanceCounter) in seconds
        F32 AccuracyS;        //< Estimated error on PlaybackTimeS and its relation to PlaybackTimeS
        F32 PlaybackSpeed;    //< Playback speed, 1.0 being normal playback, 0 paused
};

//--------------------------------------------------------------
/// D-BOX S/PDIF INFO
//--------------------------------------------------------------
struct SpdifInfo {
        SpdifInfo(F64 dPlaybackTimeS = 0, U32 nDataSize = 0, PCVOID pData = NULL);

F64 PlaybackTimeS;    //< Playback time related to S/PDIF packet in seconds
        U32 DataSize;
        PCVOID Data;          //< S/PDIF packet bytes
};
```

Fig. 4 (2 of 5)

```
//----------------------------------------------------------------
/// D-BOX STREAM INFO
//----------------------------------------------------------------
struct StreamInfo {
        StreamInfo(
                EStreamSourceType eType = SST_UNKNOWN,
                PCCHAR sSource = NULL,
                PCCHAR sAudioFormat = NULL,
                PCCHAR sLanguage = NULL,
                I32 nStreamIndex = 0,
                F32 dDurationS = 0,
                PCCHAR sCustom = NULL,
                I32 nReserved = 0);

EStreamSourceType Type;      //< Stream source type (i.e. SST_File, SST_DVD, SST_BLURAY)
        PCCHAR Source;               //< Location of the media (i.e. "E:\")
        PCCHAR AudioFormat;          //< Audio encoding and channel format of the current stream
        PCCHAR Language;             //< Language of the current stream, 3-letter ISO-639-2/T
        I32 StreamIndex;             //< Index of the current stream in source
        F32 DurationS;               //< Total length of the current stream in decimal seconds
        PCCHAR Custom;               //< Reserved for custom use
        I32 Reserved;                //< Reserved for future use
    };
} pragma pack(pop)         // Restores user struct packing.

endif  // _DBOX_CINEMOTIONTYPES_H_INCLUDED_
```

Fig. 4 (3 of 5)

dboxCineMotion.h :

```
#pragma once
#ifndef _DBOX_CINEMOTION_H_INCLUDED_
#define _DBOX_CINEMOTION_H_INCLUDED_
//------------------------------------------------------------
// D-BOX CINE MOTION API
// Copyright (C) 2008, D-BOX Technologies Inc.
// All rights reserved.
//------------------------------------------------------------
#include "dboxCineMotionTypes.h"

//------------------------------------------------------------
/// D-BOX CINE MOTION API MACROS AND DEFINES
//------------------------------------------------------------

/// Library selection macro
#define DBOX_CINEMOTION_LIB           "dbxCine32"
DBOX_PLATFORM_LIB_SUFFIX /// API Calling Convention
define DBOX_CINEMOTION_CC            __cdecl namespace dbox {

//------------------------------------------------------------
        /// D-BOX CINE MOTION API STATIC METHODS
        //------------------------------------------------------------
        class CineMotion {
        private:
                CineMotion();
        public:

/// Global API initialization.  It should be called once at startup.
                /// Initialize/Terminate calls should be balanced.
                /// Parameter:
                /// - sAppKey: should be set to a constant char * that uniquely
                ///   identifies your application (usually assigned by D-BOX).
                /// - nAppBuildVersion: should be set to an integer representing
                ///   your build number.  This field may be used by D-BOX to track
                ///   version changes or updates in your application.
                static ECineMotionResult DBOX_CINEMOTION_CC Initialize(PCCHAR
sAppKey, U32 nAppBuildVersion);
```

Fig. 4 (4 of 5)

```
            /// Global API termination.  It should be called at end.
            /// Initialize/Terminate calls should be balanced.
            static ECineMotionResult DBOX_CINEMOTION_CC Terminate();

/// Notifies that a new stream has been loaded and sends its details.
            /// This must be called in order to output motion and do synchronization.
            /// Parameter:
            /// - oStreamInfo: contains all the required information for identification.
            static ECineMotionResult DBOX_CINEMOTION_CC OnStreamOpen(const
StreamInfo & oStreamInfo);

/// Notifies that the stream was closed.  This must be called every time
            /// playback is stopped (not paused).  This will allow the motion output
device
            /// to enter standby state.
            static ECineMotionResult DBOX_CINEMOTION_CC OnStreamClose();

/// Passes synchronization information for the currently opened stream.
            /// This must be called repeatedly at a fast enough rate to do motion output
            /// drift correction.
            /// Parameter:
            /// - oSyncInfo: contains all the required information for synchronization.
            static ECineMotionResult DBOX_CINEMOTION_CC OnSyncUpdate(const
SyncInfo & oSyncInfo);

/// Passes S/PDIF packet data of the current playback stream.
            /// This, combined with OnSyncUpdate, is an alternative
            /// identification/synchronization method to OnStreamOpen +
OnSyncUpdate.
            /// Parameter:
            /// - oSpdifInfo: contains raw S/PDIF packet data along with
            ///   its associated playback time.
            static ECineMotionResult DBOX_CINEMOTION_CC OnSpdifData(const
SpdifInfo & oSpdifInfo);

/// Returns true if the API is successfully initialized.
            static BOOL DBOX_CINEMOTION_CC IsInitialized();

/// Returns true if the API is aware of a currently opened stream.
            static BOOL DBOX_CINEMOTION_CC IsStreamOpened();
        };
} endif  // _DBOX_CINEMOTION_H_INCLUDED_
```

CPU PLATFORM INTERFACE METHOD AND DEVICE FOR SYNCHRONIZING A STREAM OF MOTION CODES WITH A VIDEO STREAM

TECHNICAL FIELD

This description relates to the field of video (e.g. movie) or audio stream playback. More particularly, this description relates to methods and devices for playing motion codes synchronously with the movie or video stream.

SUMMARY OF THE INVENTION

The present document describes a CPU platform interface method and device for synchronizing a stream of motion codes with a video stream. The method and device use the video stream time stamps and movie identity information from the software movie player along with the CPU time clock to fill a queue of motion code frames and determine which frames will be sent as a motion stream to one or more actuators of a motion platform.

According to an aspect of the invention, there is provided a method embodied in a Central Processing Unit (CPU) platform having a clock. The method is for interfacing a software movie player for playing a video stream having a speed ratio and a motion service in order to synchronously play the video stream on a video display and motion code frames corresponding to the video stream on an actuator of a motion platform. The method comprises: receiving video stream time stamps indicative of elapsed nominal time from the start of the video stream; receiving a clock value from the clock, the clock value having a higher frequency than a frequency corresponding to the period between two video stream time stamps; determining a time difference between the clock value at present and the clock value corresponding to a current video stream time stamp; receiving a queue status value indicative of a queue status of a queue comprising motion code frames for the actuator, the queue status value being representative of a duration for playing the motion code frames in the queue, namely a queue duration; determining a clock duration value by adding the queue duration to the time difference; determining a nominal duration value by converting the clock duration value given the speed ratio; determining a future time value indicative of an elapsed nominal time from the start of the video stream when last motion code frame of the queue will be played, by adding the nominal duration to the current video stream time stamp; receiving an identity of the video stream; using the identity, accessing a file comprising the motion code frames for the video stream; filling the queue with the motion code frames in the order in which they must be played on the actuator of the motion platform after the future time value; and outputting the motion code frames as a motion stream using the motion service.

According to another aspect of the invention, there is provided a motion code manager installed on a Central Processing Unit (CPU) platform having a clock. The motion code manager being for interfacing a software movie player for playing a video stream having a speed ratio and a motion service in order to synchronously play the video stream on a video display and motion code frames corresponding to the video stream on an actuator of a motion platform. The motion code manager comprises: a motion source manager for receiving an identity of the video stream and for accessing a file comprising the motion code frames for the video stream; and a synchronizer. The synchronizer is for: receiving video stream time stamps indicative of elapsed nominal time from the start of the video stream; receiving a clock value from the clock, the clock value having a higher frequency than a frequency corresponding to the period between two video stream time stamps; receiving a queue status value indicative of a queue status of a queue comprising motion code frames for the actuator, the queue status value being representative of a duration for playing the motion code frames in the queue, namely a queue duration; determining a time difference between the clock value at present and the clock value corresponding to a current video stream time stamp; determining a clock duration value by adding the queue duration to the time difference; determining a nominal duration value by converting the clock duration value given the speed ratio; determining a future time value indicative of an elapsed nominal time from the start of the video stream when last motion code frame of the queue will be played, by adding the nominal duration to the current video stream time stamp; and filling the queue with the motion code frames in the order in which they must be played on the actuator of the motion platform after the future time value. The motion service outputs the motions code frames as a motion stream.

According to another aspect of the invention, there is provided a self-contained USB audio stream to motion stream on RJ45 converter comprising a single USB input and a single RJ45 output.

BRIEF DESCRIPTION OF THE DRAWINGS

Further features and advantages of the present invention will become apparent from the following detailed description, taken in combination with the appended drawings, in which:

FIG. 4 is a program listing for an add-on API for a software movie player according to an embodiment of the invention;

It will be noted that throughout the appended drawings, like features are identified by like reference numerals.

DETAILED DESCRIPTION

Figure 1:
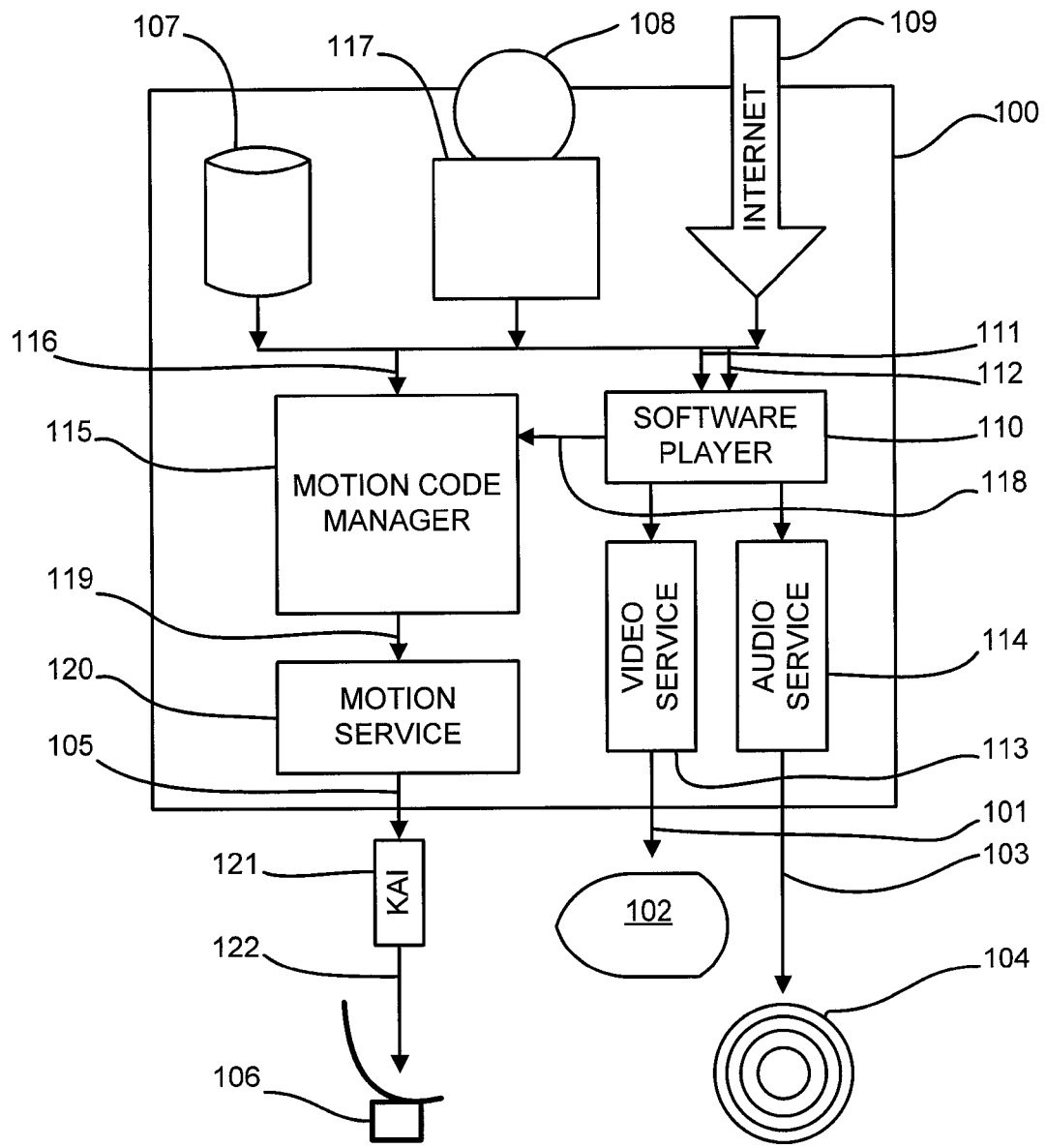
FIG. 1 is a block diagram illustrating a CPU platform and its immediate environment in accordance with an embodiment of the invention.

Referring now to the drawings, and more particularly to FIG. 1, a block diagram illustrates an embodiment of the invention operated by a Central Processing Unit (CPU) platform 100 having a clock, not shown. The CPU platform 100 is configured for sending synchronously a video stream 101 to a video device 102, an audio stream 103 to an audio device 104 and a motion stream 105 to a motion platform 106, according to video codes, audio codes and motion codes located on at least one of a local repository 107 (e.g. a hard disk), a removable medium 108 (e.g. a DVD, a Blue Ray, a USB Key, etc.) and a remote repository 109 (e.g. Internet, Ethernet, etc.).

Usually, video codes and audio codes are on the same medium. A usual software movie player 110 gets video codes 111 and audio codes 112, generates a video stream and an audio stream, synchronizes them and sends the video stream 101 to the video device 102 via a video service module 113 and the audio stream 103 to the audio device 104 via an audio service module 114 simultaneously.

A motion code manager 115 receives motion codes 116 from one of: the local repository 107, the removable medium 108 via a medium reader 117 and the remote repository 109. The motion codes 116 could be on the same medium as the video codes and audio codes or on a different medium/location (e.g. video codes and audio codes can be burned on a DVD while motion codes are available by Internet). The motion code manager 115 receives a synchronization stream 118 synchronously with the video stream 101 and the audio stream 103 from the software movie player 110.

Motion codes 116 comprise indications of position of each actuator of the motion platform 106 at each fixed period of time. A frequency of 400 indications of position per second for each actuator is accurate for a realistic experience. Indications of position for each actuator for a given period of time form a motion code frame The motion code manager 115 prepares and sends to a motion service 120 packets of motion code frames 119 synchronously with the video stream 101 and the audio stream 103, according to the motion codes 116 and the synchronization stream 118. The motion service 120 receives the packets of motion code frames 119, adapts them according to the kind of the motion platform 106 and the liking of a user, converts them in the motion stream 105 in USB audio format and makes them available on USB plugs, not shown, of the CPU platform 100. In another embodiment, not shown, a motion service converts motion code frames in a motion stream in other format that USB audio such as custom USB format, Ethernet format or Internet format.

A self-contained USB audio stream to motion stream on RJ45 converter 121, namely a USB KAI-1P module for connecting one motion platform, is plugged in the CPU platform 100, receives the motion stream in USB audio format 105, converts it in a Kinelink stream 122 and makes the Kinelink stream 122 available on a Kinelink network, not shown. Kinelink is the name of the proprietary and specialized protocol used to transport a motion stream from a motion controller, namely the USB KAI-1P module 121 to the actuators of the motion platform 106. Then the motion platform 106 receives the Kinelink stream 122 and converts it in motion synchronously with the video stream 101 and the audio stream 103. For a person skilled in the art, it is easy to replace the USB KAI-1P module with a KAI-4P module for connecting four motion platforms or other devices.

Figure 2:
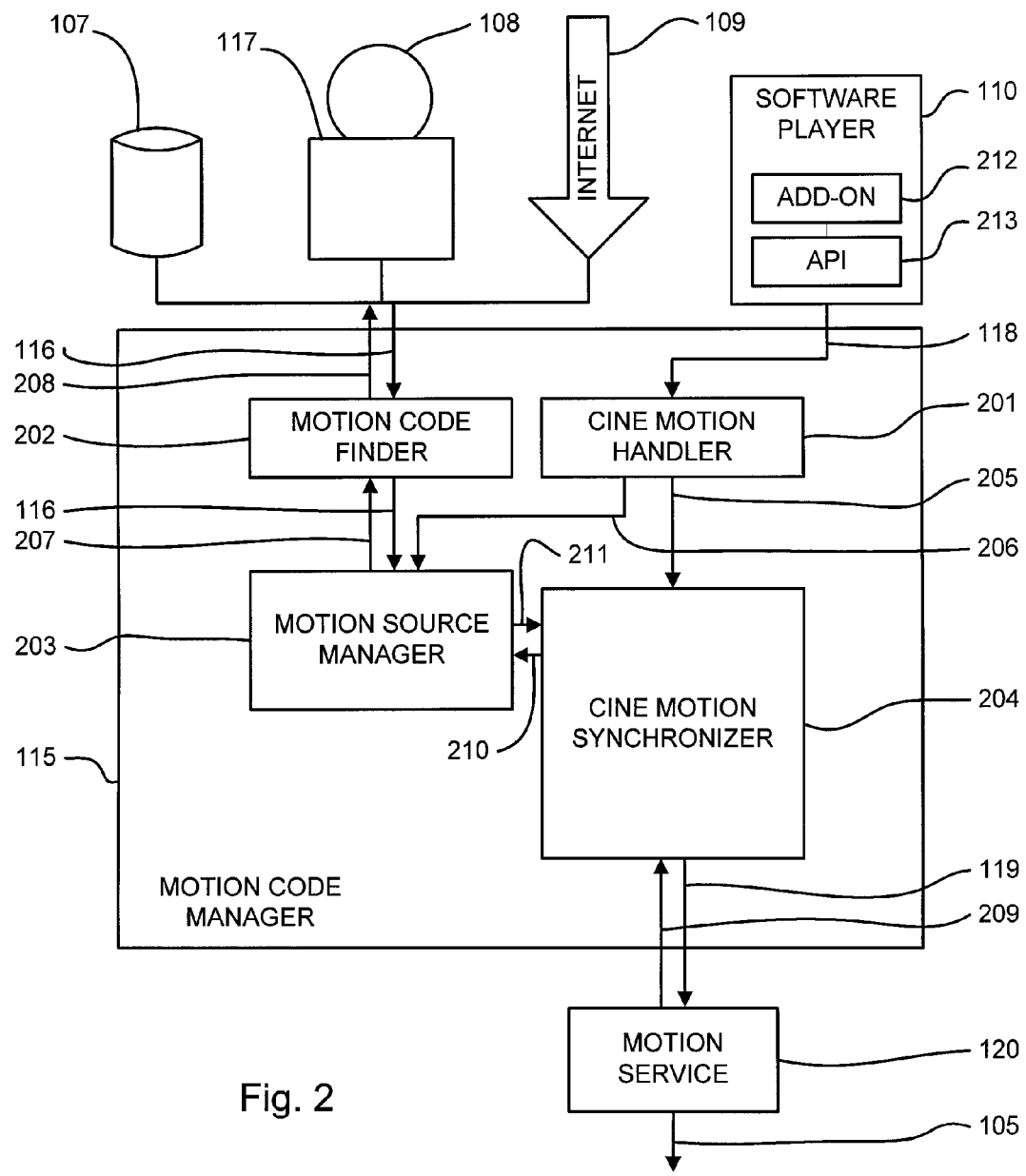
FIG. 2 is a block diagram illustrating parts of the CPU platform of FIG. 1.

Now referring to FIG. 2, there are shown details of the motion code manager 115 and interactions with its environment. The motion code manager 115 comprises a cine-motion handler 201, a motion code finder 202, a motion source manager 203 and a cine-motion synchronizer 204. Environment of the motion code manager 115 comprises at least one of the local repository 107, the removable medium 108 and the remote repository 109; the software movie player 110 and the motion service 120.

The software player 110 comprises a specific add-on 212 or an API 213 for emitting the synchronization stream 118. An add-on is a software bundle that allows the user to extend and customize a base application. An API (Application Programming Interface) is a set of functions, procedures, methods, classes or protocols that an operating system, library or service provides to support requests made by computer programs. The synchronization stream 118 comprises a time stream and identification codes which include an identity of the video stream 101 such as the name of the video, the media type, a private serial number, a public serial number of the video, an identification of the current scene, etc. The time stream provides video stream time stamps indicative of elapsed nominal time from the start of the video stream 101 or of the audio stream 103 and speed ratio values. The stamps indicative of elapsed nominal time could be emitted at a fixed frequency range 1 to 100 hertz or could be emitted at random instants. A speed ratio value is a division of an elapsed nominal time by a corresponding elapsed clock time, nominal time being defined by the video stream time stamps. A speed ratio value equal to 2 corresponds to the function "Forward 2×" of the software movie player 110. A speed ratio value equal to 0.5 corresponds to the function "Slow 2×" of the software movie player 110.

The cine-motion handler 201 receives the synchronization stream 118, separates the time stream and the identification codes and sends the time stream 205 and the identification codes 206 respectively to the cine-motion synchronizer 204 and to the motion source manager 203.

The motion source manager 203 receives identification codes 206 and makes a call 207 to the motion code finder 202 for finding motion codes 116 corresponding to video stream 101 and audio stream 103 according to the identity of the video stream 101 included in the identification codes 206. Thus, the motion code finder 202 makes an investigation 208 on each available repository (e.g. the local repository 107, the removable medium 108 via a medium reader 117, the remote repository 109, etc.) for finding motion codes 116 according to identification codes 206. Then, the motion code finder 202 sends motion codes 116 to the motion source manager 203.

The cine-motion synchronizer 204 receives the time stream 205 and a queue status stream 209 in real-time respectively form the cine-motion handler 201 and the motion service 120. The queue status stream 209 provides a queue status value indicative of a queue status of a queue comprising motion code frames for the actuators. The queue status value is representative of a duration for playing the motion code frames in the queue, namely a queue duration. The frequency of emission of motion code frames by the motion service 120 being fixed (e.g. 400 Hz), the number of motion code frames gives the time at which the last motion code frame of the queue will be emitted in the motion stream 105.

Given the queue status stream 209 and the time stream 205, the cine-motion synchronizer determines the next motion code frames which must be filled in the queue and makes a call 210 to the motion source manager 203 for sending it back these determined motion code frames 211.

Then, the cine-motion synchronizer 204 receives the motion code frames 211, treats it, and sends treated motion code frames 119 to the motion service 120, adding its in the queue of the motion service 120.

Figure 3A:
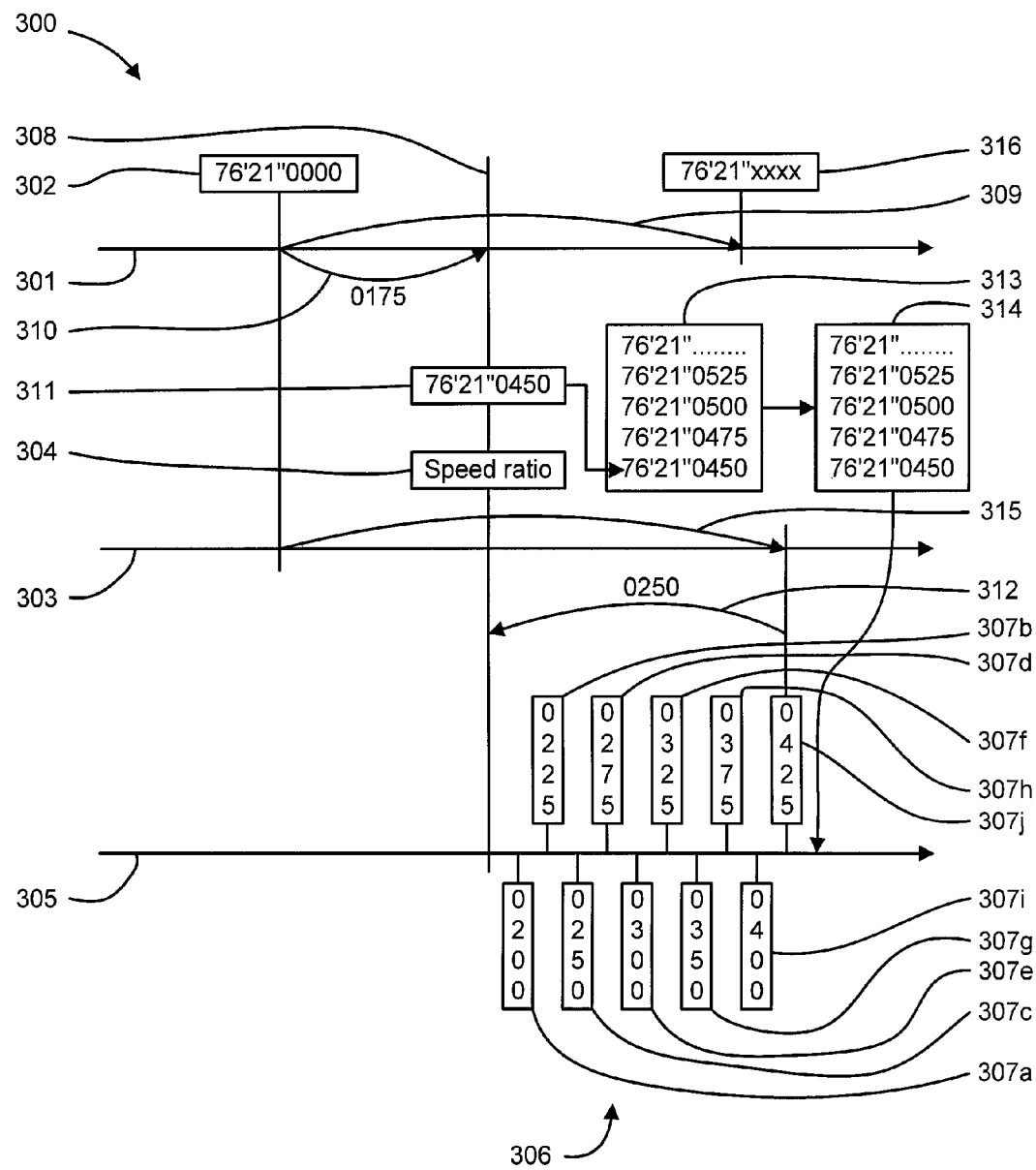
FIGS. 3a, 3b and 3c are timing diagrams of synchronization of motion codes to be played according to a video stream.

Referring now to FIG. 3*a*, there is shown a timing diagram of synchronization 300 of motion code frames to be played according to video stream time stamps. The motion code frames to be played are emitted by the motion service 120, on FIG. 2, in the motion stream 105, on FIG. 2. The video stream time stamps are provided by the time stream 205, on FIG. 2.

A first timing axis 301 shows a current video stream time stamp 302 according to a clock time, provided by the clock. The video stream time stamp 302 is indicative of elapsed nominal time from the start of the video stream. A second timing axis 303 shows operations of the cine motion synchronizer 204 according to the clock time. A third timing axis 305 represents the motion service playback time, showing the queue status of a queue 306 according to the clock time. The queue 306 is operated by the motion service 120 and comprises motion code frames 307*a-j* for the actuator(s) of the motion platform 106. A present axis 308 shows the present time crossing the first timing axis 301, the second timing axis 303 and the third timing axis 305.

The cine motion synchronizer 204 receives a clock value from the clock of the CPU platform 100. The clock value has a higher frequency than a frequency corresponding to the period between two video stream time stamps 309;

The cine motion synchronizer 204 determines a time difference 310 between the clock value at present and the clock value corresponding to the current video stream time stamp 302.

The cine motion synchronizer 204 determines a clock duration value 315 by adding a queue duration 312 to the time difference 310.

The cine motion synchronizer 204 determines a nominal duration value, not shown, by converting the clock duration 315 value given a speed ratio 304. The speed ratio 304 is regularly determined by the cine motion synchronizer 204, based on a speed ratio value provided by the time stream 205 and a comparison of the difference of the video stream time stamps 302-316 with the clock duration value 315.

The cine motion synchronizer 204 determines a future time value 311 indicative of an elapsed nominal time from the start of the video stream when last motion code frame 307j of the queue will be played, by adding the nominal duration to the current video stream time stamp 302.

Then, the cine motion synchronizer 204 calls the motion source manager 203 for a packet of motion code frames 313 comprising motion code frames in the order in which they must be played on the actuator(s) of the motion platform 106 after the future time value 311.

The cine motion synchronizer 204 receives the packet of motion code frames 313 and re-samples them forming a re-sampled packet of motion code frames 314. The re-sampling is for playing speed variations of the motion code frames in a smooth manner. The re-sampling is based on the speed ratio 304, and the motion code frames 307a-j waiting to be played in the queue 306. The re-sampling allows adapting the speed of motion stream 105 to the speed of the video stream 101 (e.g. "Forward 2×", "Slow 2×") and allows recovering the lead or the delay, namely the drift of the motion stream 105, smoothly.

The re-sampling process is performed at a higher sampling rate (8000 Hz) than the motion service rate (400 Hz). Some motion code frames are reduced by ⅛₀₀₀ s in length to speedup playback, while they are extended by ⅛₀₀₀ s to slow playback. This high-rate synchronized motion stream is then filtered and down-sampled to 400 Hz for smooth continuous playback.

If the re-sampling is not sufficient to recover the drift, this step is skipped.

Then, the cine motion synchronizer 204 fills the queue 306 with packets of motion code frames 314.

On FIG. 3a, motion code frames 307a-j of the queue 306 are synchronized with the video stream time stamp 302 and the speed ratio 304 is equal to one. The re-sampling does not change the packet of motion code frames 313.

Figure 3B:
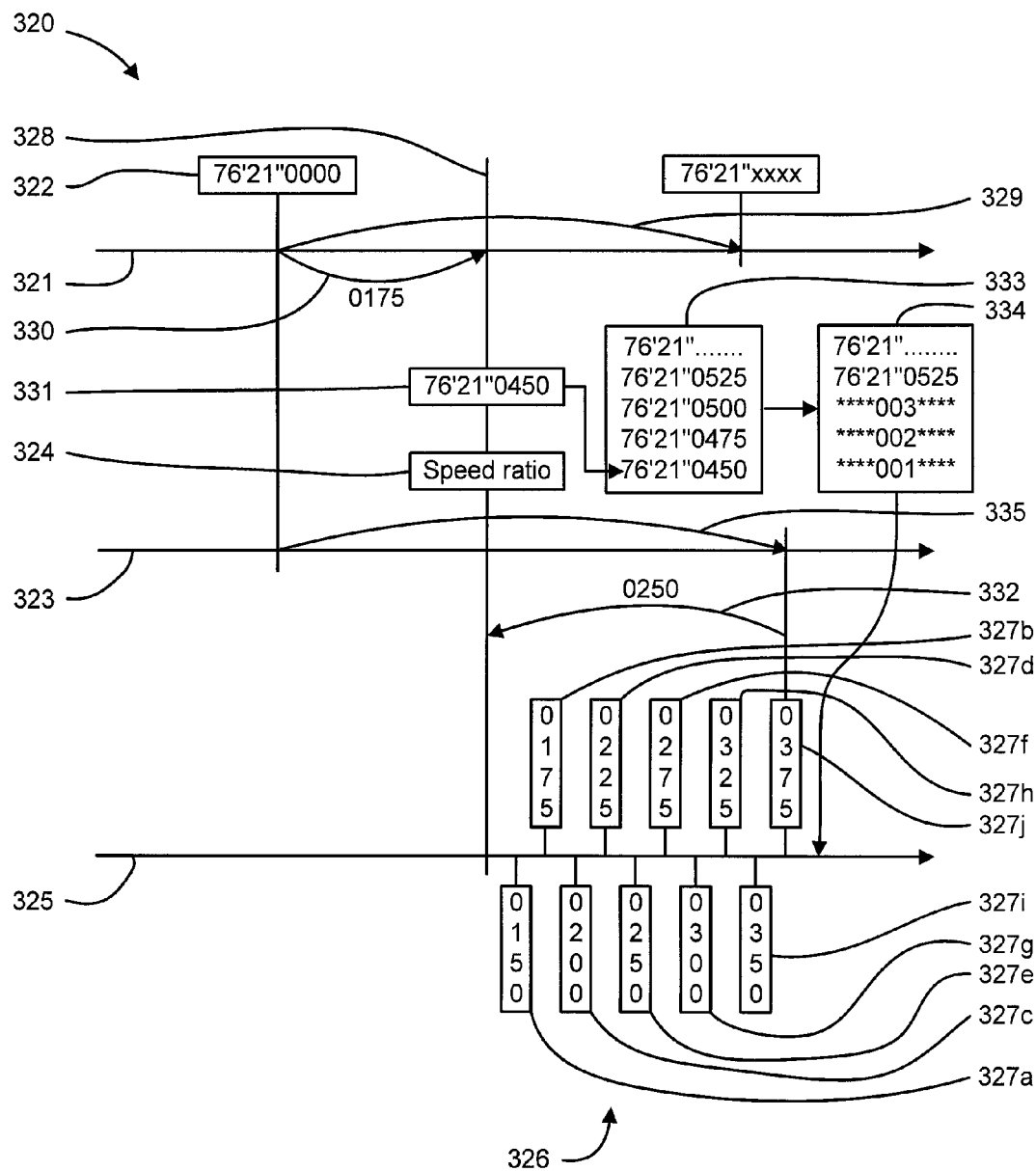

Referring to FIG. 3b, there is shown a timing diagram of synchronization 320 of motion code frames to be played according to the same video stream and at the same present time as shown on FIG. 3a. On FIG. 3b, motion code frames 327a-j of a queue 326 are not synchronized with the video stream time stamp 322, motions code frames 327a-j will be played too late. Then the re-sampling changes the value of the first, the second and the third motion code frames to recover the drift smoothly.

Figure 3C:
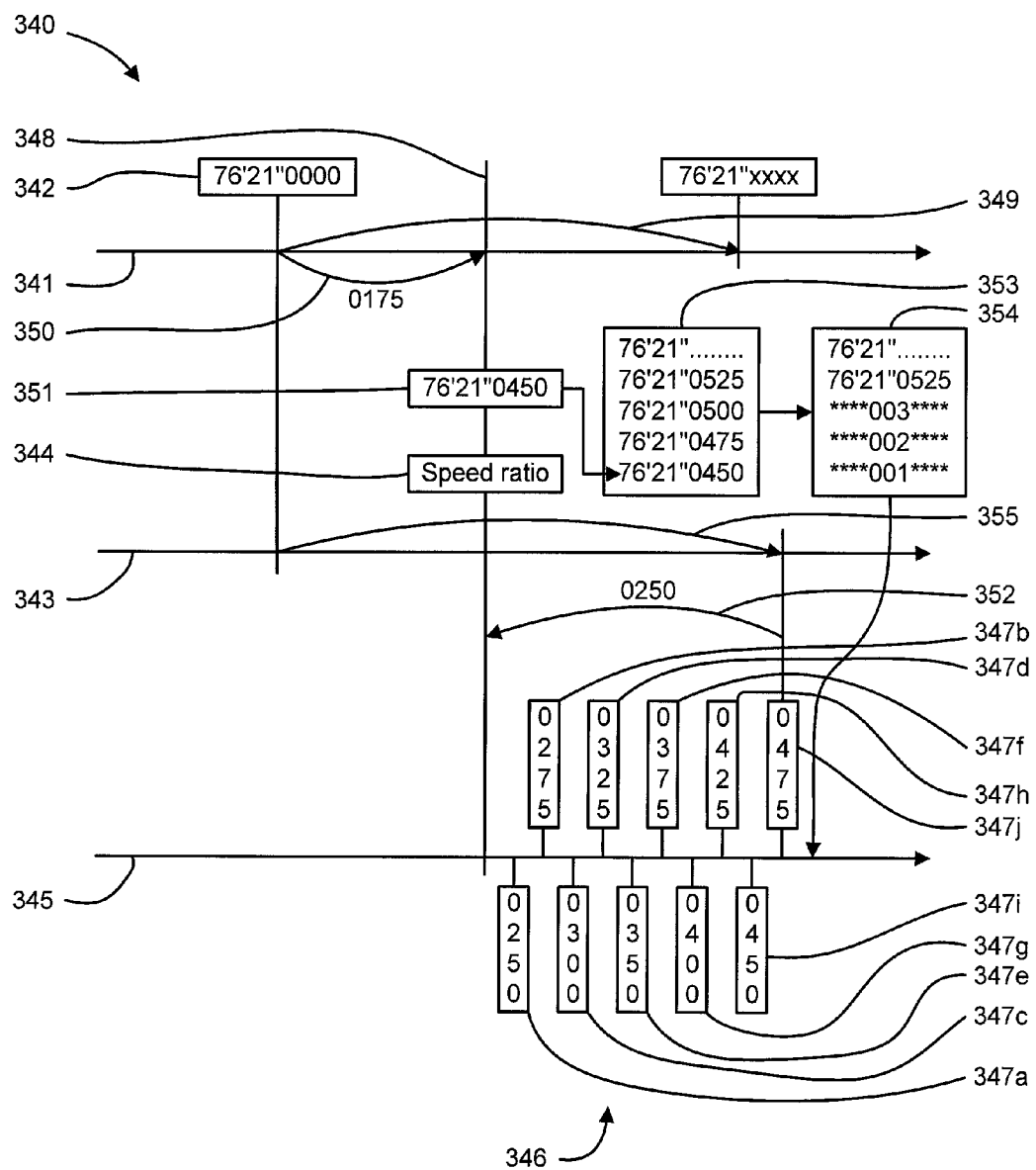

Referring to FIG. 3c, there is shown a timing diagram of synchronization 340 of motion code frames to be played according to the same video stream and at the same present time than shown on FIG. 3a. On FIG. 3c, motion code frames 347a-j of a queue 346 are not synchronized with the video stream time stamp 342, motions code frames 347a-j will be played too early. Then the re-sampling changes the value of the first, the second and the third motion code frames to recover the drift smoothly.

Referring to FIG. 4 there is shown a program listing for an add-on API for a software movie player according to an embodiment of the invention.

Figure 5:
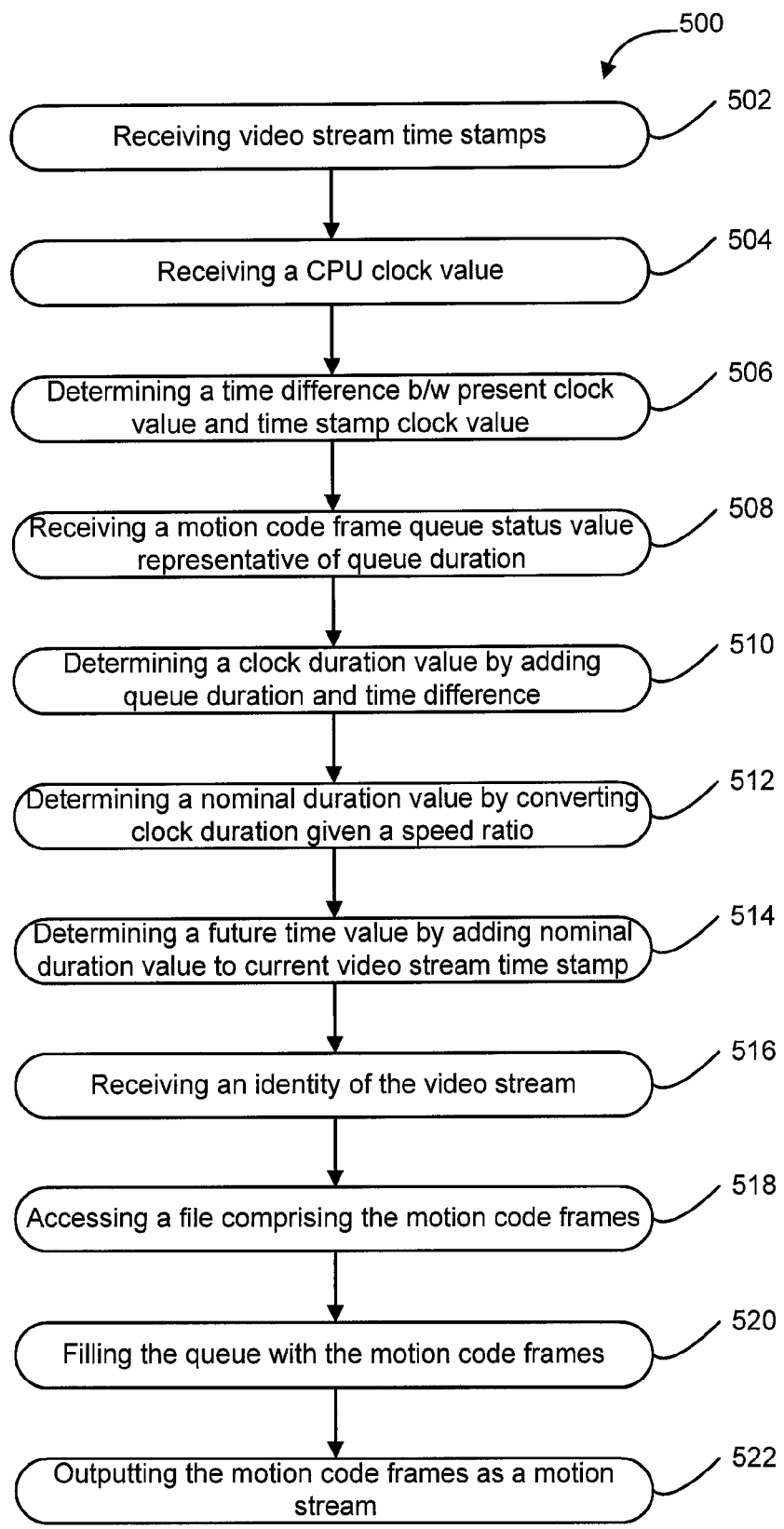
FIG. 5 is a flowchart showing a method for interfacing a software movie player and a USB audio driver according to an embodiment of the invention.

Referring to FIG. 5, there is shown a flowchart of a method 500 embodied in a Central Processing Unit (CPU) platform having a clock. The method is for interfacing a software movie player for playing a video stream having a speed ratio and a motion service in order to synchronously play the video stream on a video display and motion code frames corresponding to the video stream on an actuator of a motion platform. The method comprises: receiving video stream time stamps indicative of elapsed nominal time from the start of the video stream (step 502); receiving a clock value from the clock, the clock value having a higher frequency than a frequency corresponding to the period between two video stream time stamps (step 504); determining a time difference between the clock value at present and the clock value corresponding to a current video stream time stamp (step 506); receiving a queue status value indicative of a queue status of a queue comprising motion code frames for the actuator, the queue status value being representative of a duration for playing the motion code frames in the queue, namely a queue duration (step 508); determining a clock duration value by adding the queue duration to the time difference (step 510); determining a nominal duration value by converting the clock duration value given the speed ratio (step 512); determining a future time value indicative of an elapsed nominal time from the start of the video stream when last motion code frame of the queue will be played, by adding the nominal duration to the current video stream time stamp (step 514); receiving an identity of the video stream (step 516); using the identity, accessing a file comprising the motion code frames for the video stream (step 518); filling the queue with the motion code frames in the order in which they must be played on the actuator of the motion platform after the future time value (step 520); and outputting the motion code frames as a motion stream using the motion service (step 522).

Figure 6A:
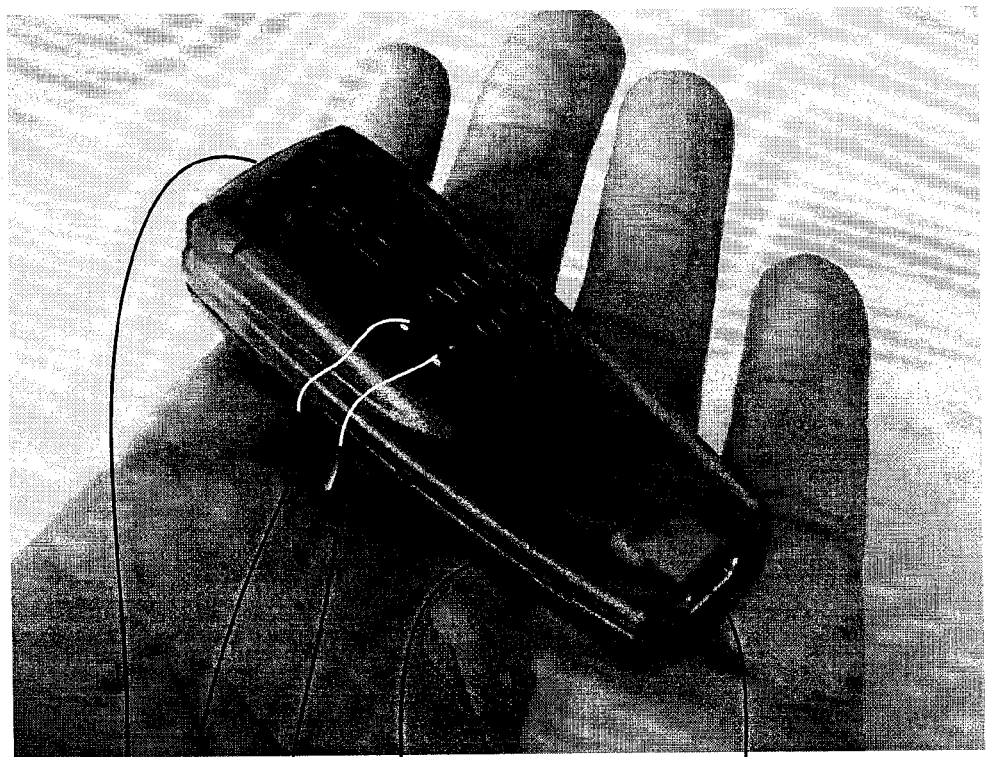
FIG. 6a and FIG. 6b are photographs of a USB KAI-1P module according to an embodiment of the invention.
Figure 6B:
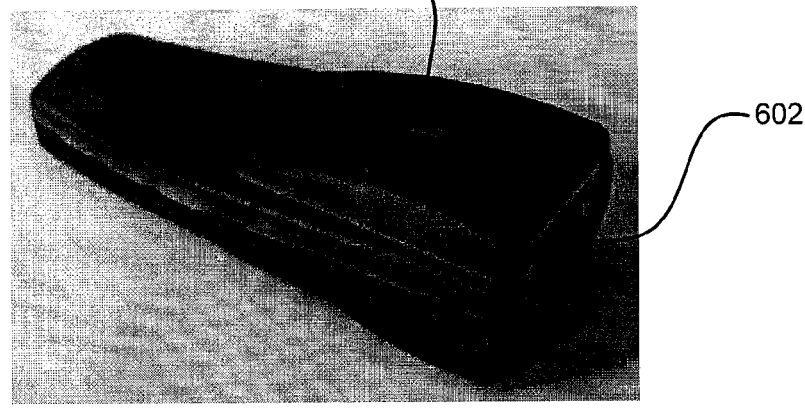

Ending with FIG. 6a and FIG. 6b, there are shown photographs of a USB KAI-1P module 600. The module 600 receives a motion stream according to an audio USB protocol and electric power by an USB input plug 601. The module 600 converts the audio USB motion stream, without delay, into a Kinelink motion stream and provides it by a RJ45 output plug 602. The module 600 further comprises an output active status led 603 and a power status led 604.

While preferred embodiments of the invention have been described above and illustrated in the accompanying drawings, it will be evident to those skilled in the art that modifications may be made therein without departing from the essence of this invention. Such modifications are considered as possible variants comprised in the scope of the invention.

The invention claimed is:

1. A method embodied in a Central Processing Unit (CPU) platform having a clock, the method for interfacing a software movie player for playing a video stream having a speed ratio and a motion service in order to synchronously play the video stream on a video display and motion code frames corresponding to the video stream on an actuator of a motion platform, the method comprising:
- receiving video stream time stamps indicative of elapsed nominal time from the start of the video stream;
- receiving a clock value from the clock, the clock value having a higher frequency than a frequency corresponding to the period between two video stream time stamps;
- determining a time difference between the clock value at present and the clock value corresponding to a current video stream time stamp;
- receiving a queue status value indicative of a queue status of a queue comprising motion code frames for the actuator, the queue status value being representative of a duration for playing the motion code frames in the queue, namely a queue duration;
- determining a clock duration value by adding the queue duration to the time difference;
- determining a nominal duration value by converting the clock duration value given the speed ratio;
- determining a future time value indicative of an elapsed nominal time from the start of the video stream when last motion code frame of the queue will be played, by adding the nominal duration to the current video stream time stamp;
- receiving an identity of the video stream;
- using the identity, accessing a file comprising the motion code frames for the video stream;
- filling the queue with the motion code frames in the order in which they must be played on the actuator of the motion platform after the future time value; and
- outputting the motion code frames as a motion stream using the motion service.

2. The method as claim 1, further comprising re-sampling motion code frames for playing speed variations of the motion code frames in a smooth manner.

3. A motion code manager installed on a Central Processing Unit (CPU) platform having a clock, the motion code manager for interfacing a software movie player for playing a video stream having a speed ratio and a motion service in order to synchronously play the video stream on a video display and motion code frames corresponding to the video stream on an actuator of a motion platform, the motion code manager comprising:
- a motion source manager for receiving an identity of the video stream and for accessing a file comprising the motion code frames for the video stream; and
- a synchronizer for:
  - receiving video stream time stamps indicative of elapsed nominal time from the start of the video stream;
  - receiving a clock value from the clock, the clock value having a higher frequency than a frequency corresponding to the period between two video stream time stamps;
  - receiving a queue status value indicative of a queue status of a queue comprising motion code frames for the actuator, the queue status value being representative of a duration for playing the motion code frames in the queue, namely a queue duration;
  - determining a time difference between the clock value at present and the clock value corresponding to a current video stream time stamp;
  - determining a clock duration value by adding the queue duration to the time difference;
  - determining a nominal duration value by converting the clock duration value given the speed ratio;
  - determining a future time value indicative of an elapsed nominal time from the start of the video stream when last motion code frame of the queue will be played, by adding the nominal duration to the current video stream time stamp; and
  - filling the queue with the motion code frames in the order in which they must be played on the actuator of the motion platform after the future time value;

the motion service outputting the motions code frames as a motion stream.

* * * * *